March 28, 1950            O. A. KNOPP            2,501,725
INSTRUMENT STRUCTURE FOR PORTABLE
TESTING VOLTMETERS Filed April 9, 1945                          2 Sheets-Sheet 2

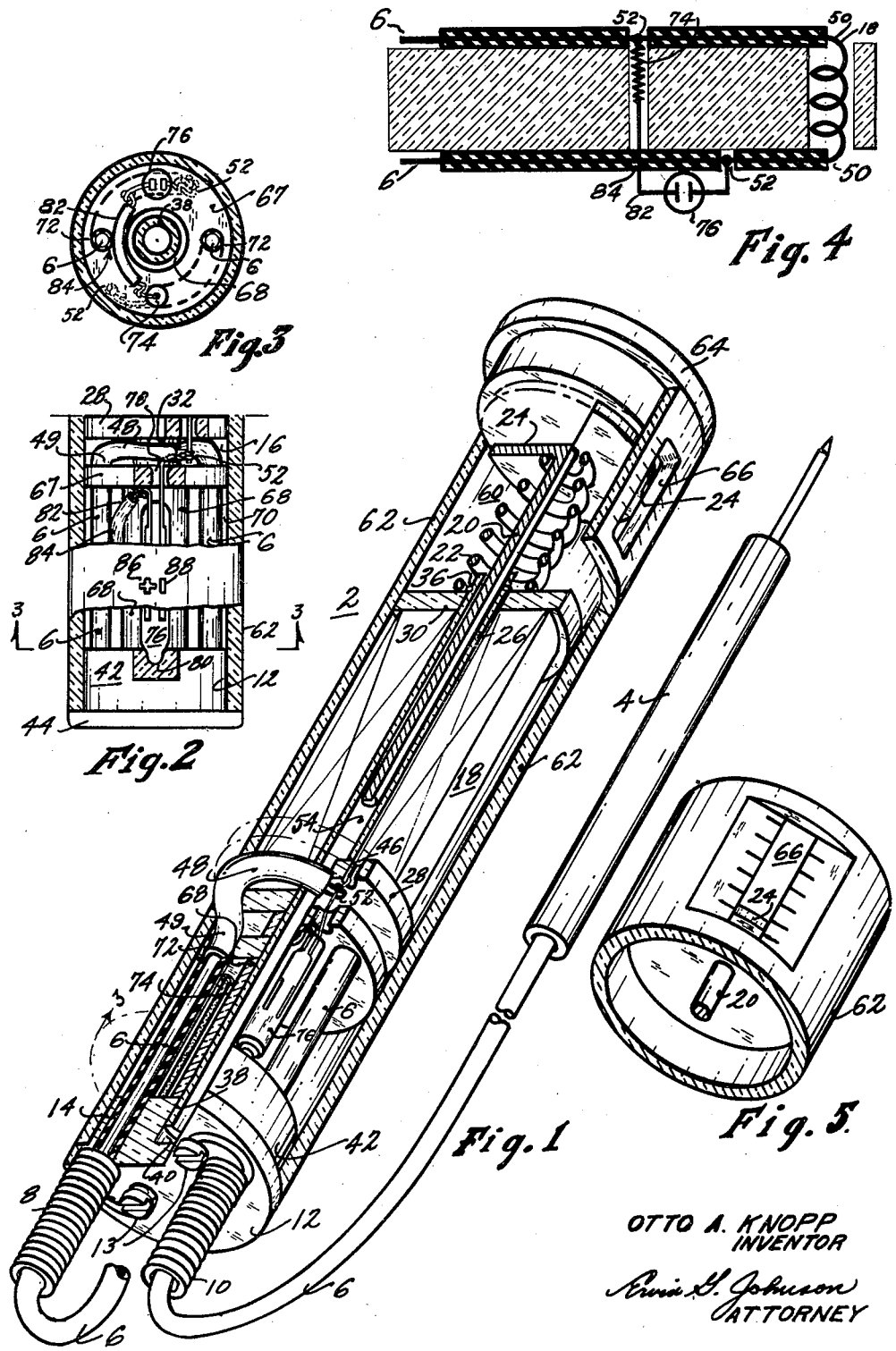

OTTO A. KNOPP
INVENTOR

ATTORNEY

Patented Mar. 28, 1950

2,501,725

UNITED STATES PATENT OFFICE 2,501,725

INSTRUMENT STRUCTURE FOR PORTABLE TESTING VOLTMETERS

Otto A. Knopp, Oakland, Calif.

Application April 9, 1945, Serial No. 587,395

12 Claims. (Cl. 171—95)

This invention is in portable electric voltage testers and more particularly in the instruments used in such testers; for indicating the values of alternating and direct current voltages, and the polarity of unidirectional current circuits tested; the presence or absence of electrical energy on metallic parts in the vicinity of electrical energy sources; etc.

One of the principal objects of the invention is to provide improvements insuring a higher degree of safety in the use of such instruments. Among the more common hazards associated with the use of such portable instruments are those resulting from the deterioration of lead wire insulation, such, for example, as is due to wear in repeated bending of the flexible conductor at the point of entry to the instrument, or due to continuous compression or tension on insulation while under electrical stress. In the absence of precautions to insure adequate insulation between conductors, as by properly spacing them in air or by insulating materials in addition to the insulation wrappings thereof, the conductors occasionally come into electrical contact and effect a short circuit of the circuit to which the instrument is applied.

While it is possibly impracticable to prevent the occurrence of short circuits altogether, it is possible both to minimize their number and effect, and to so localize the occurrence in such manner that a substantial improvement in safety to user and apparatus is effected. Accordingly, in keeping with the object stated above, this invention provides through novel arrangement of electrical components of the instrument, for a substantial reduction of such hazards.

It is another object of this invention to provide for readily servicing this type portable instrument. Portable instruments of this type are subjected to exceedingly rough usage since they are intended for the use of persons unskilled in the handling of electrical instruments of the measuring or other more refined types, as well as for the skilled technologist, for use in rough work, being often dropped against solid objects and otherwise being subjected to treatment which, if applied to the refined types of instruments, would be abusive and result in damage of irreparable character. Portable voltage testers in use often become laden with foreign matter; such as oil, water, and dirt or metal particles so that they may fail to operate or become unreliable in their operation. Accordingly it is desirable that such testers be reconditioned at intervals and that they be easily serviced in the field if necessary by the owner or user irrespective of his skill, a bare minimum of such skill being the criterion of capacity. In such instruments it is also desirable, incident to such servicing, to be able to operate the motive mechanism of the instrument while it is outside its protective cover, to thus speed up the calibration and checking of the operability of the instrument in repair shops or factory. These various desirable serviceability features are incorporated in this invention and form an object thereof.

The achievement of a design for a voltage tester indicating instrument which is practical and economical to manufacture either in small or in large quantities is a further object of this invention. The manufacture of instruments of this type in very large quantities involves the design of molds for forming, in one or more pieces, the insulating framework of the instrument and so results in the economical manufacture of such instruments through obtaining the benefits of mass production techniques. The economical manufacture of such instruments in small quantities and in a manner such that the substantial equivalent of the large quantity product is economically achieved is accomplished by this invention.

Features of construction of advantage in the invention include arrangements whereby the operative electrical components of the instrument are all carried on a single central rigid member which is united to an end closure of the instrument cover and which central member provides support for partition forming members which segregate and/or position the various dynamic components, maintaining all in a unitary assembly; the arrangement providing annular ring-shaped mounting spaces which open radially outward in all directions from the center rigid member to provide an extraordinary degree of accessibility to the insulating framework for making the necessary connections; which provides in conjunction with the cover, once the dynamic assembly of the instrument is placed therein, a separate closed space for each group of one or more components; and which further provides substantial reinforcement between longitudinal members to prevent crushing and bending of the instrument cover.

It is another object of this invention to provide for the employment of standard, commercially available, shapes and sizes to a maximum degree so that a minimum of unskilled help may be used in the manufacture, and that standard manufacturing equipment and technique may be employed to effect all or the majority of the operations of manufacture.

It is a further object of the invention to provide for a voltage tester design such that two models having greater or less of the advantages described herein, may be obtained by minor changes in the sizes of interchangeable parts and the omission of other parts.

Another object of the invention is to so provide in a voltage tester that all conducting parts having a high potential difference are separated by large air gaps, by large impedances, or by considerable insulation, and by substantial creepage paths.

An additional object of the invention is to provide for anchoring the test leads in the instrument body in an improved manner such that the leads will not become loose and exert a strain on connections within the instrument, and in such manner that manufacture is simplified.

Another object of the invention is to provide an indicator construction for such instruments which is both simple, and effective to improve the serviceability of the instrument.

Further objects and advantages will become apparent from a consideration of the following specification and the accompanying drawing, wherein like reference characters refer to like elements in the several figures, and in which:

Figure 1 is an isometric view with parts broken away on several planes;

Figure 2 is a partial section through a portion of the instrument to more clearly illustrate the manner of achieving certain objectives;

Figure 3 is a view taken from plane 3—3 of Figure 2.

Figure 4 illustrates by diagram certain features of the invention;

Figure 5 is a fragmentary view of a detail of the indicating device.

Figure 6:
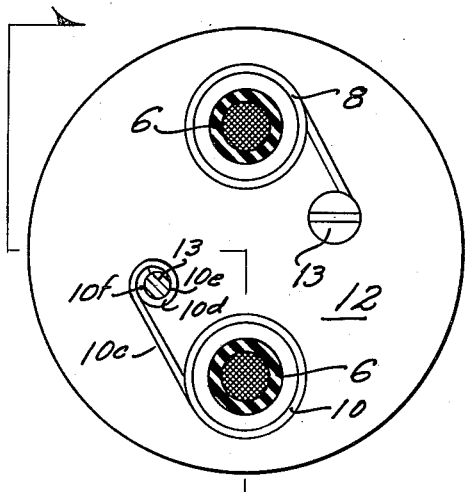
Figures 6, 7, and 8 show further details.

The voltage tester comprises an indicating instrument 2 to which there is secured a pair of test prods 4 (one only being shown), by flexible conductors 6 having lead-in portions protected by separate steel helical springs 8 and 10 separately anchored in an insulating plug 12 by anchoring screws 13. The springs and all metallic parts on the exterior of the instrument are so constructed and arranged that the metal parts of the springs 8 and 10 are not connected electrically, and so that they do not come into contact in normal use. Therefore, should the user fail to repair the flexible conductors 6 even after the conductor wears through the sheath of insulation inside springs 8 and 10, no short circuit occurs between these springs or between conductors 6 immediately adjacent these springs, unless the springs are forced into contact when voltage is applied. By proportioning the springs and the distance apart of holes 14, the springs cannot readily make contact.

The conductors 6 pass into the instrument through holes 14 in plug 12, which holes are spaced apart by substantial creepage paths both on the inside and the outside surfaces of plug 12, and inside the instrument the conductors 6 are received by an annular chamber 16 wherein an anchorage and electrical connection with the indicating components is effected for each conductor.

A solenoid type voltage indicator is provided and comprises a spool carrying a solenoid winding 18, and a plunger 20 resisted by a spring 22 and carrying an indicator 24.

The solenoid spool is formed by an extended tube 26 of fibre insulation having a solenoid receiving portion adjacent the ends of which there are mounted the spool end-forming discs 28 and 30. Disc 28 is centrally drilled to snugly fit the tube 26 and is held in position on tube 26 by the winding and a short sleeve 32 held by a set screw (not shown) passing radially therethrough and anchored in the wall of tube 26. Disc 30 is also centrally drilled to snugly fit on the end of tube 26 and is held thereon by the winding and a toroidal wire spring 36 fitting in a groove turned near the plunger receiving end of the tube. The spool formed by the tube and discs 28 and 30 is assembled and the winding wound thereon prior to assembly into the instrument.

A portion 38 or tube 26 extends beyond the sleeve 32 and is received by a socket 40 centrally formed in plug 12, being held therein as by a suitable set screw (not shown). The plug 12 is shaped to have a cylindrical cover receiving portion 42 and a shoulder portion 44, the cylindrical portion 42 being of equal diameter to the diameter of discs 28 and 30. Passages 46 are provided in disc 28 for the passage into space 16 of the terminal leads of the solenoid 18. These passages open into chamber 16 at two points displaced approximately 180 geometrical degrees about the axis of the spool, and the solenoid assembly is so fixed with respect to plug 12 that the passages 46 are spaced approximately 90 geometrical degrees from the axes of holes 14 in plug 12.

The portion 48 of each conductor 6 is bent into a plane normal to the axis of tube 26 at the point of entry 49 into chamber 16 so as to lie parallel to disc 28, and is further bent in that normal plane on an arc about the tube 26 and extends to a point approximately 90 degrees from its point of entry into chamber 16, where it is spliced to a terminal 50 of the solenoid at 52.

Both conductors 6 are so bent in the same direction about the axis of tube 26, as illustrated in dotted lines in Figure 3, so that they do not cross nor come into close proximity. The axial dimension, or thickness, of space 16 is sufficient only to accommodate the diameter of the conductor with its insulation when tube end 38 is fastened in socket 40. In this way a bight anchorage of each conductor is separately achieved within the instrument. It is particularly to be noted that the bights are formed at points which are widely separated in electrical spacing. This is because, when electrical insulation is placed under mechanical stress it deteriorates both due to the mechanical stress and due to electrical stress applied, with the frequent result that the conductor insulation breaks down if the voltage gradient is too great. By this present construction though the conductor insulation is weakened electrically, the wide spacing across insulating space prevents the occurrence of a short circuit. It is further particularly to be noted that the connections to the solenoid leads at 52 are also spaced about 180 degrees, and that they are protected from mechanical strain due to the pulling of conductors 6.

The tube 26 provides a plunger passage 54 to receive the solenoid plunger 20. Plunger 20 has centrally fixed to one end thereof the indicator disc 24 of a diameter slightly less than the diameter of disc 30. The disc and plunger are free to rotate about the central axis and have considerable lateral freedom, but are longitudinally held against movement toward the solenoid by the helical spring 22 which converges to surround the plunger closely adjacent the disc 24 in order to centralize the disc and plunger. The spring 22 is further centralized at its opposite end by the end of tube 26 and spring ring 36 lying within the adjacent convolution of spring 22. The assembly of the plunger, solenoid and plug, with conductors 6 and prods 4 forms a unit assembly which may be tested before insertion into the cover and positioning adjacent the indicating scale about to be described.

The cover for this unit assembly is formed of a tube 62 of insulation of uniform internal diameter to fit the portion 42 of plug 12 and the discs 28 and 30, and of a length sufficient to encompass the chamber 60 required for indicating disc 24 and spring 22, the solenoid spool, chamber 16, and to engage shoulder 44; as well as, to receive a suitable closure at the indicator chamber end, such as a second plug 64 generally similar to plug 12.

A suitable window 66, milled axially through the wall of tube 62 adjacent the indicator chamber 60, provides for seeing the edge of indicator disc 24 in its various positions and a suitable scale is marked adjacent the window 66 in conjunction with which the indicator 24 indicates the value of voltage applied to the solenoid winding. Because the indicator is entirely disposed within the barrel 62 it is protected from damage from outside objects, such as it might sustain through being hooked into clothing if it were provided with a pointer passing through the slot 66. By employing the disc the need for a guideway is avoided because the same indication is provided irrespective of the rotary position of the disc, and the disc may, therefore, be permitted to seek its own rotary position. This eliminates any variation in accuracy due to torsional stress which would be set up in spring 22 were the disc 24 held against rotary movement. As illustrated by Figure 5, parallax between the scale and indicator 24 may be avoided by cutting the barrel 62 away adjacent window 66 to provide a scale face near a tangent to the disc 24, and a window pane, not shown, may be secured over the window and scale to prevent the entry of foreign particles.

The plug 12 carrying the solenoid and indicator assembly is inserted into the cover by a simple unidirectional axial movement, and is withdrawn with equal simplicity of movement, it being unnecessary to provide any particular alignment for insertion of the indicator. After assembly the plug 12 is secured to the housing by screws (not shown) passing through the tube end adjacent plug portion 42.

The construction thus far pointed out is that simply of a solenoid type voltage indicator wherein the movement of a solenoid operated plunger and indicator indicates the voltage of the circuit tested, and it is evident that the chamber 16 may be formed directly by the disc 28 and the inward end of plug 12, the structure about to be described being omitted.

The simple solenoid type indicator is desirably improved by the addition of means of indicating the polarity of a direct current circuit, which, in this case, is done by placing in parallel with the solenoid, a cathode glow tube with suitable current limiting resistance, and suitably identifying the polarity of a certain prod with the glowing electrode.

To provide space for the glow tube and resistor, and to suitably mount them in a manner to insure against short circuits of a damaging character, the tubes 62 and 26 are made of such length that chamber 16 is removed from plug 42, a disc 67 similar to disc 28 is mounted on tube extension 38 against sleeve 32, and spacing sleeve 68 is provided between plug 12 and disc 67. A chamber 70 for the polarity indicating means is thereby provided. Holes 72 are provided in disc 67 in axial alignment with holes 14 in plug 12 to provide rigid support for the conductors 6 to pass through chamber 70 parallel to the axis of tube 26.

The resistor 74 and the glow tube 76 are mounted at approximately 90 degree intervals from the conductors, as shown in Figure 3. Small holes 78 are provided in disc 67 through which one terminal of lamp 76, and one terminal (not shown) of resistor 74, pass into chamber 16 and are connected to the solenoid-conductor splices 52. These holes serve to position the adjacent ends of the lamp and resistor through the conductors issuing therefrom. To mount the other ends of the lamp and resistor a recess for each is provided in plug 12, as illustrated at 80 in Figure 2, to receive the end of the lamp 76 and the resistor terminal (not shown).

One electrode of glow lamp 76 is joined to the end of the resistor adjacent plug 12 by an insulated conductor 82 which passes between sleeve 68 and one conductor 6. It will be observed that these two electrical conductors, 6 and 82, cross in close proximity at 84 (see Figures 2 and 4), with their insulating sheaths in bearing contact, and that, when the insulation breaks down, through wear or otherwise, the metals of the two conductors come into contact and form a low resistance path between the two conductors 6 and 82. The crossing in this manner, however, facilitates the construction, and in order to avoid possibility of a short circuit due to such insulation breakdown, the resistor 74 is included in the circuit from the wire 6 adjacent such point of crossing, to the other conductor 6, as more clearly shown in Figure 4. Thus, even though the insulation wears through to the metal at the point 84, so that lamp 76 is short-circuited, the resistance 74 is still effective to prevent more than a very small current from flowing. The limiting resistance 74 varies from a quarter of a megohm to a megohm, which means that, when the contact does occur through wear, the current drawn by resistance 74 at rated voltages is so minute that the voltage of the circuit tested does not drop appreciably. Accordingly, although the lamp 76 will not operate because short circuited as described, voltage will, nevertheless, be indicated by the solenoid, and the lack of lamp illumination indicates the existence of a fault. The circuit relationships giving rise to these conditions are illustrated in Figure 4, in which the space is shown by insulation and represents the long insulating path between the conductors and the two high-impedance conductors forming the solenoid winding and the resistance.

Another feature of this invention provides that on direct or unidirectional current circuits, an illuminated polarity sign indicates the polarity of a certain prod. To this end, as illustrated in Figure 2, a window forming plus sign 86 is cut entirely through the wall of barrel 62 and is so oriented that light from the electrodes can pass through it to the eye of an observer, and a window forming a negative sign 88 is cut similarly so that it also permits vision of both electrodes of the lamp. The electrode adjacent the negative mark is connected to the prod 4 identified as the prod whose polarity is indicated by the illuminated sign. In this way the user can invariably determine what the polarity of the unidirectional current circuit terminal under test is, directly on the instrument, knowing that the illuminated sign of the illuminated electrode is the polarity of the identified prod.

By proportioning the inductance of coil 18 with respect to the resistance of the circuit, which resistance includes resistance 74 and the resistance of coil 18, with reference to the time lag of discharge of neon lamp 76 at voltages just above its trigger voltage and with reference to the lowest voltage desired to be detected, the time constant of the circuit including coil 18, resistance 74 and lamp 76, is made such that the direct current transient voltage which occurs when a prod 4 is withdrawn from contact with a low voltage circuit under test is of a value sufficiently greater than the trigger voltage (and several times that of the voltage of the tested circuit and sustained above the trigger value for a period sufficiently long to cause the electrode connected to the positive side of the tested circuit at the time of break, to flash; so that the instrument is usable: to detect voltages of tested circuits which are but a fraction of the trigger value by observing for the occurrence of such a flash upon breaking the circuit with the test prod; to detect the polarity of circuits carrying direct current; by observing for flash on only the one electrode; and to provide means whereby a method of identifying alternating current circuits of low voltage as such is embodied in rapidly repeatedly breaking the circuit with the prod and observing the lamp electrodes for flashing at both electrodes indiscriminately, which manner of flashing indicates alternating current. From the foregoing description it is believed evident that the instrument may be constructed with or without the polarity indicating feature by simply changing lengths of tubing and omitting the additional parts and procedures referred to in large part.

In addition it will be readily appreciated that the complete subassembly pertaining to the polarity indicating function may be assembled as a unit with conductors 6 and plug 12, there remaining the steps of fastening the solenoid assembly into socket 40 and making the connections at 52 in order to complete the union of the solenoid assembly to the assembled unit.

It has been recited as being among the objects of this invention that the design be such that molding techniques may be taken advantage of in manufacurting large quantities. This is possible in this design because the essential framework illustrated by parts 26, 28, 30, 67, and 42, being all of insulating material, may be formed as one integral unit with these component parts and spacers in the required relation, by one pressure molding operation, and that the various electrical fittings may thereafter be assembled on this framework.

Figure 7:
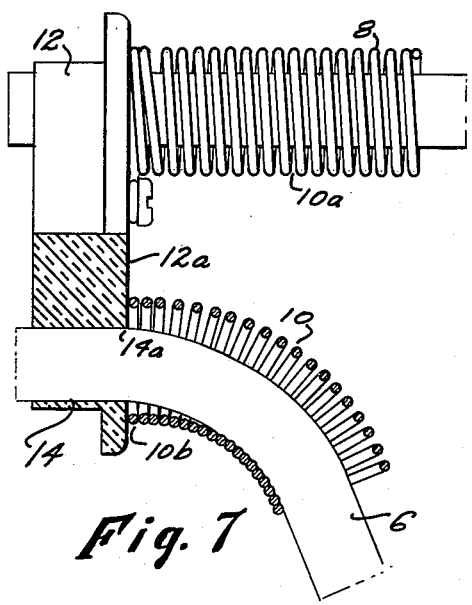
Figure 8:
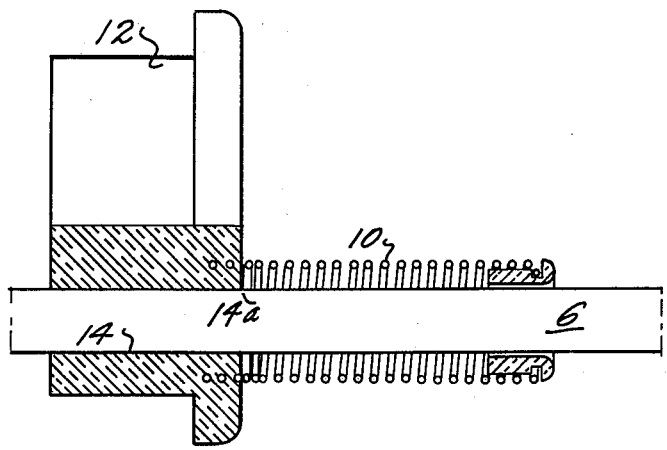

The manner of maintaining a high degree of freedom from wear of the conductors at the outlet 14a of passage 14 from plug 12 is most clearly illustrated in Figures 6 and 7, showing that the coil springs 8 and 10 are formed with spaced convolutions as at 10a, and are rigidly fixed for immobility on plug 12 to prevent cutting of the insulation at this point. The springs are distinct, providing a substantial flat insulating surface 12a therebetween. The spacing of the turns of the spring prevents rubbing on the insulation and excessive pulling action on the portion of the cord within the instrument. The springs may be moulded into the plug 12 and a suitable protective grommet may be provided at the outer ends of the springs, as illustrated in Figure 8.

I claim:

1. In a portable voltage testing indicating instrument, a solenoid winding assembly having a flat surface, means providing a second flat surface arranged in fixed parallel relation to said first surface to provide a space between the surfaces, a flexible conductor, a passage formed in said means providing a rigid mounting for said conductor and opening into said space at an angle to the surfaces, the thickness of said space between the surfaces being equal to the thickness of the conductor to receive the conductor between said parallel surfaces within close fit, said conductor having a portion thereof extending a substantial distance into the space laterally of the opening and forming a bight therewith.

2. In a portable voltage tester indicating instrument, a solenoid winding, a polarity indicating lamp; a current limiting resistor, a pair of insulation sheathed conductors connected to the terminals of said solenoid for conducting electrical energy from a source of current to said solenoid, a third conductor connecting one terminal of said lamp and one terminal of said resistor together, means connecting the second terminal of said resistor to one of said pair of conductors, means connecting the other terminal of said lamp to the second of said pair of conductors; the various elements being so relatively positioned, with the third conductor nearest the second of the pair of conductors, that the third conductor is the one which will most probably come in contact with the second of said pair of conductors.

3. In a portable voltage tester indicating instrument, an indicating lamp, a current limiting resistance, a pair of conductors for conducting electrical energy from a source of current to said instrument, said lamp and said resistance being connected in series between the conductors, the conductors being separated to prevent their coming into physical contact, the means forming the connection of the lamp to one of the conductors being such that the lamp might be short-circuited by contact of the connection forming means with that conductor, the resistance being connected to the other conductor electrically between it and the region of possible contact.

4. In a portable voltage tester having a solenoid type movement including a solenoid and a plunger actuated thereby, an indicator on said plunger, said indicator being formed by a circular member having its radius at right angles to the direction of motion of the plunger and being secured to said plunger at the circular center, and a cover providing an indicator chamber of circular section to reciprocatively receive said indicator and a slot providing a window through which the edge of the circular member may be viewed to determine its position.

5. A portable voltage tester having an elongated cover of uniform internal cross section with a closed end and a viewing window adjacent the closed end; and an indicating instrument assembly including a solenoid, a plunger and an indicator on a plug member forming a mounting for said solenoid, plunger, and indicator; said entire assembly being insertable to operative position within said cover by a single unidirectional movement of the plug along the axis of said cover.

6. In a portable voltage tester having a solenoid type movement in which the solenoid is cylindrical and has a reciprocating plunger actuated along its axis, and having a tubular cover enclosing the solenoid and plunger; an indicator carried by said plunger, and a longitudinal slot in said housing wall adjacent the path of movement of said indicator and forming a window through which to view said indicator, said indicator being formed by a circular disc of slightly less diameter than the internal diameter of the tubular cover.

7. A portable voltage tester having an elongated cover of uniform internal cross section, a solenoid assembly including means forming a spool for a solenoid winding and including a tube forming a passage for a solenoid plunger, a plug member for closing one end of the cover, a socket formed in said plug member; said tube having a portion thereof extending outward of the spool end and adapted to be received by the socket of said plug member.

8. A portable voltage tester according to claim 7, said tube portion being sufficiently long to provide a space between the spool and the plug member, means providing a passage for a conductor into said space and for a bight in said conductor at the point of entry into said space, said spool engaging said conductor to maintain said bight.

9. A portable voltage tester comprising a housing, an electrical instrument mechanism within the housing having an operative portion of high impedance, a pair of flexible conductors anchored to said housing therewithin and terminating in test prods therewithout, said conductors passing through the housing of said instrument by separate holes spaced apart by electrical insulation and extending within the instrument to connect to the operative portion of the instrument at opposite ends of the high impedance, said conductors being widely spaced apart within the instrument by electrical insulation, said conductors being individually insulated by an insulating sheath from the prods to a point within the housing and the sheaths being spaced apart by the electrical insulation, and means rigidly fixing the positions of said conductors at all points in the housing.

10. A construction according to claim 9, and spring guards secured to the housing at the points of entry of, and surrounding, each conductor, the spring guards being separated electrically from each other to prevent passage of current from one to the other when the conductor insulation wears out inside the guards.

11. In an electrical voltage testing instrument, a support comprising a central elongated portion forming a hub, a plurality of annular partition forming members united with said hub as their center and spaced axially to provide axially displaced spaces therebetween for the disposition therein of instrument components, and a cover member adapted to receive said support and to form with said partition forming members, separate chambers for said components.

12. In an electrical voltage testing instrument, an elongated cover member of uniform internal spatial cross section, and a frame for reception by said cover member, said frame comprising a central portion for alignment with the axis of the cover, and a series of radially disposed discs rigidly mounted on the central portion and extending over the cross section of the cover to provide mutual support for the central portion by the cover and for the cover by the central portion.

OTTO A. KNOPP.

REFERENCES CITED

The following references are of record in the file of this patent:

UNITED STATES PATENTS

| Number | Name | Date |
|---|---|---|
| 408,018 | Knowles | July 30, 1889 |
| 420,422 | Warner | Jan. 28, 1890 |
| 747,871 | Eldredge | Dec. 22, 1903 |
| 1,193,095 | West | Aug. 1, 1916 |
| 2,075,860 | Mehaffie | Apr. 6, 1937 |
| 2,154,070 | Franz | Apr. 11, 1939 |
| 2,243,553 | D'Entrement | May 27, 1941 |
| 2,264,832 | Ensign | Dec. 2, 1941 |
| 2,290,760 | Mehaffie | July 21, 1942 |